(12) United States Patent
Fukui et al.

(10) Patent No.: US 9,124,343 B2
(45) Date of Patent: Sep. 1, 2015

(54) ELECTRONIC APPARATUS AND COMMUNICATION CONTROL METHOD

(71) Applicant: KABUSHIKI KAISHA TOSHIBA, Minato-ku, Tokyo (JP)

(72) Inventors: Kotaro Fukui, Hamura (JP); Hiroyuki Oka, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 334 days.

(21) Appl. No.: 13/849,671

(22) Filed: Mar. 25, 2013

(65) Prior Publication Data

US 2013/0217337 A1 Aug. 22, 2013

Related U.S. Application Data

(63) Continuation of application No. 12/942,409, filed on Nov. 9, 2010, now abandoned.

(30) Foreign Application Priority Data

Nov. 13, 2009 (JP) .................. 2009-260102

(51) Int. Cl.
*H04B 7/26* (2006.01)
*H04B 5/02* (2006.01)
(Continued)

(52) U.S. Cl.
CPC .. *H04B 7/26* (2013.01); *H04B 5/02* (2013.01); *H04W 76/00* (2013.01);
(Continued)

(58) Field of Classification Search
CPC ..... H04B 7/26; G06K 19/0723; H04W 84/18; H04W 88/02

USPC ......................... 455/41.2, 41.1, 557
See application file for complete search history.

(56) References Cited

U.S. PATENT DOCUMENTS 5,675,494 A 10/1997 Sakurai et al.
6,363,424 B1 * 3/2002 Douglas et al. ............... 709/224
(Continued)

FOREIGN PATENT DOCUMENTS

JP 07-044740 2/1995
JP 07-110851 4/1995
(Continued)

OTHER PUBLICATIONS

Notice of Reasons for Rejection mailed by the Japan Patent Office on Mar. 15, 2011 in corresponding Japanese patent app. No. 2009-260102 in 6 pages.
(Continued)

*Primary Examiner* — Hai V Nguyen
(74) *Attorney, Agent, or Firm* — Knobbe, Martens, Olson & Bear LLP

(57) ABSTRACT

According to one embodiment, a connection control module is configured to transmit a connection request signal during a period in which a communication module is in an unconnected state, and to establish a connection between the communication module and an external device which are in a close proximity state. A halt module is configured to halt a communication control module from executing a negotiation with the external device, when the connection between the communication module and the external device is released by the connection release request signal from the external device and thereafter the connection between the communication module and the external device is re-established by the connection control module.

15 Claims, 10 Drawing Sheets

(51) Int. Cl.
*H04W 76/00* (2009.01)
*H04W 74/00* (2009.01)
*H04W 76/02* (2009.01)
*H04W 76/06* (2009.01)
*H04W 84/10* (2009.01)
*H04W 84/18* (2009.01)

(52) U.S. Cl.
CPC ............ *H04W 74/004* (2013.01); *H04W 76/02* (2013.01); *H04W 76/028* (2013.01); *H04W 76/06* (2013.01); *H04W 84/10* (2013.01); *H04W 84/18* (2013.01)

(56) References Cited

U.S. PATENT DOCUMENTS

| | | | |
|---|---|---|---|
| 6,450,961 B1* | 9/2002 | Shiki et al. | 600/458 |
| 6,882,632 B1* | 4/2005 | Koo et al. | 370/335 |
| 7,177,408 B1* | 2/2007 | Urquizo et al. | 379/93.28 |
| 7,254,708 B2* | 8/2007 | Silvester | 713/170 |
| 7,275,255 B2* | 9/2007 | Suda et al. | 725/80 |
| 7,359,674 B2* | 4/2008 | Markki et al. | 455/41.2 |
| 7,443,811 B2* | 10/2008 | Sturrock et al. | 370/282 |
| 7,483,402 B2* | 1/2009 | Sturrock et al. | 370/282 |
| 7,505,404 B2* | 3/2009 | Sturrock et al. | 370/228 |
| 7,551,649 B2* | 6/2009 | Sturrock et al. | 370/517 |
| 7,570,658 B2* | 8/2009 | Sturrock et al. | 370/465 |
| 7,590,384 B2* | 9/2009 | Dawidowsky | 455/41.1 |
| 7,631,200 B2* | 12/2009 | Niwa et al. | 713/300 |
| 7,747,279 B2* | 6/2010 | Hoddie | 455/557 |
| 8,036,244 B2* | 10/2011 | Naoe et al. | 370/469 |
| 8,051,182 B2* | 11/2011 | Naoe et al. | 709/227 |
| 8,056,802 B2* | 11/2011 | Gressel et al. | 235/382 |
| 8,117,318 B2* | 2/2012 | Odakura | 709/227 |
| 8,233,843 B2* | 7/2012 | Hashimoto et al. | 455/41.2 |
| 8,261,979 B2* | 9/2012 | Gressel et al. | 235/382.5 |
| 8,284,684 B2* | 10/2012 | Osawa et al. | 370/252 |
| 8,320,831 B2* | 11/2012 | Hashimoto et al. | 455/41.1 |
| 8,437,320 B2* | 5/2013 | Tamura | 370/338 |
| 8,457,558 B2* | 6/2013 | Hashimoto et al. | 455/41.2 |
| 8,521,636 B2* | 8/2013 | Chang | 705/37 |
| 8,630,312 B2* | 1/2014 | Shao et al. | 370/476 |
| 8,725,932 B2* | 5/2014 | Yano et al. | 711/103 |
| 8,805,276 B2* | 8/2014 | Li et al. | 455/15 |
| 8,817,788 B2* | 8/2014 | Kakumaru | 370/392 |
| 8,886,188 B2* | 11/2014 | Tinnakornsrisuphap et al. | 455/436 |
| 8,938,214 B2* | 1/2015 | Shibata | 455/411 |
| 2003/0134590 A1* | 7/2003 | Suda et al. | 455/3.06 |
| 2004/0199834 A1* | 10/2004 | Fukae | 714/699 |
| 2005/0159173 A1* | 7/2005 | Dowling | 455/456.3 |
| 2005/0221858 A1* | 10/2005 | Hoddie | 455/557 |
| 2006/0039279 A1* | 2/2006 | Sturrock et al. | 370/228 |
| 2006/0039283 A1* | 2/2006 | Sturrock et al. | 370/235 |
| 2006/0039294 A1* | 2/2006 | Sturrock et al. | 370/252 |
| 2006/0039295 A1* | 2/2006 | Sturrock et al. | 370/252 |
| 2006/0039302 A1* | 2/2006 | Sturrock et al. | 370/282 |
| 2006/0039350 A1* | 2/2006 | Sturrock et al. | 370/351 |
| 2006/0039403 A1* | 2/2006 | Sturrock et al. | 370/465 |
| 2006/0041673 A1* | 2/2006 | Sturrock et al. | 709/230 |
| 2006/0041675 A1* | 2/2006 | Sturrock et al. | 709/231 |
| 2006/0041677 A1* | 2/2006 | Sturrock et al. | 709/232 |
| 2006/0044153 A1* | 3/2006 | Dawidowsky | 340/825.22 |
| 2006/0117195 A1* | 6/2006 | Niwa et al. | 713/300 |
| 2007/0124211 A1* | 5/2007 | Smith | 705/21 |
| 2008/0065877 A1* | 3/2008 | Son et al. | 713/151 |
| 2008/0126560 A1* | 5/2008 | Takayama et al. | 709/233 |
| 2008/0129879 A1* | 6/2008 | Shao et al. | 348/723 |
| 2008/0189422 A1* | 8/2008 | Naoe et al. | 709/227 |
| 2008/0261598 A1* | 10/2008 | Tinnakornsrisuphap et al. | 455/436 |
| 2008/0279560 A1* | 11/2008 | Osawa et al. | 398/130 |
| 2008/0279562 A1* | 11/2008 | Naoe et al. | 398/140 |
| 2009/0169030 A1 | 7/2009 | Inohara | |
| 2009/0305630 A1* | 12/2009 | Kuroda et al. | 455/41.1 |
| 2010/0240318 A1* | 9/2010 | Tomoeda | 455/68 |
| 2010/0257355 A1* | 10/2010 | Shinozaki | 713/153 |
| 2010/0262701 A1* | 10/2010 | Odakura | 709/228 |
| 2010/0285743 A1* | 11/2010 | Li et al. | 455/15 |
| 2010/0328469 A1* | 12/2010 | Hashimoto et al. | 348/207.1 |
| 2011/0013591 A1* | 1/2011 | Kakumaru | 370/331 |
| 2011/0117837 A1* | 5/2011 | Fukui et al. | 455/41.1 |
| 2011/0228108 A1* | 9/2011 | Hashimoto et al. | 348/207.1 |
| 2011/0320612 A1* | 12/2011 | Oka et al. | 709/227 |
| 2012/0083214 A1* | 4/2012 | Hashimoto et al. | 455/41.2 |
| 2012/0147268 A1* | 6/2012 | Hassan et al. | 348/552 |
| 2012/0320413 A1* | 12/2012 | Nagasaki | 358/1.15 |
| 2012/0320414 A1* | 12/2012 | Shibata | 358/1.15 |
| 2013/0022335 A9* | 1/2013 | Khedouri et al. | 386/259 |
| 2013/0148162 A1* | 6/2013 | Park et al. | 358/1.15 |
| 2013/0258880 A1* | 10/2013 | Sturrock et al. | 370/252 |
| 2013/0297780 A1* | 11/2013 | Sturrock et al. | 709/224 |

FOREIGN PATENT DOCUMENTS

| | | |
|---|---|---|
| JP | 08-022514 | 1/1996 |
| JP | 08-086862 | 4/1996 |
| JP | 2001-256565 | 9/2001 |
| JP | 2004-318707 | 11/2004 |
| JP | 2009-104397 A | 5/2009 |
| JP | 2009-140176 | 6/2009 |
| JP | 2009-159477 | 7/2009 |

OTHER PUBLICATIONS

Notice of Reasons for Rejection mailed by the Japan Patent Office on Aug. 2, 2011 in corresponding Japanese patent app. No. 2009-260102 in 8 pages.

First Office Action mailed by Japan Patent Office on Sep. 10, 2013 in the corresponding Japanese patent application No. 2012-004993.

* cited by examiner

| Device mode | Description |
|---|---|
| Proactive | Mode in which connection request is actively issued for purpose of data transfer.<br>If application for data transfer is started, device mode transitions to proactive mode. |
| Flexible | Mode in which connection request is actively issued for purpose of connection.<br>When peer device is in proactive mode, flexible mode is changed to reactive mode.<br>When peer device is in reactive mode, flexible mode is changed to proactive mode. |
| Reactive | Mode in which connection request from proactive mode device or flexible mode device is awaited. |

FIG. 6

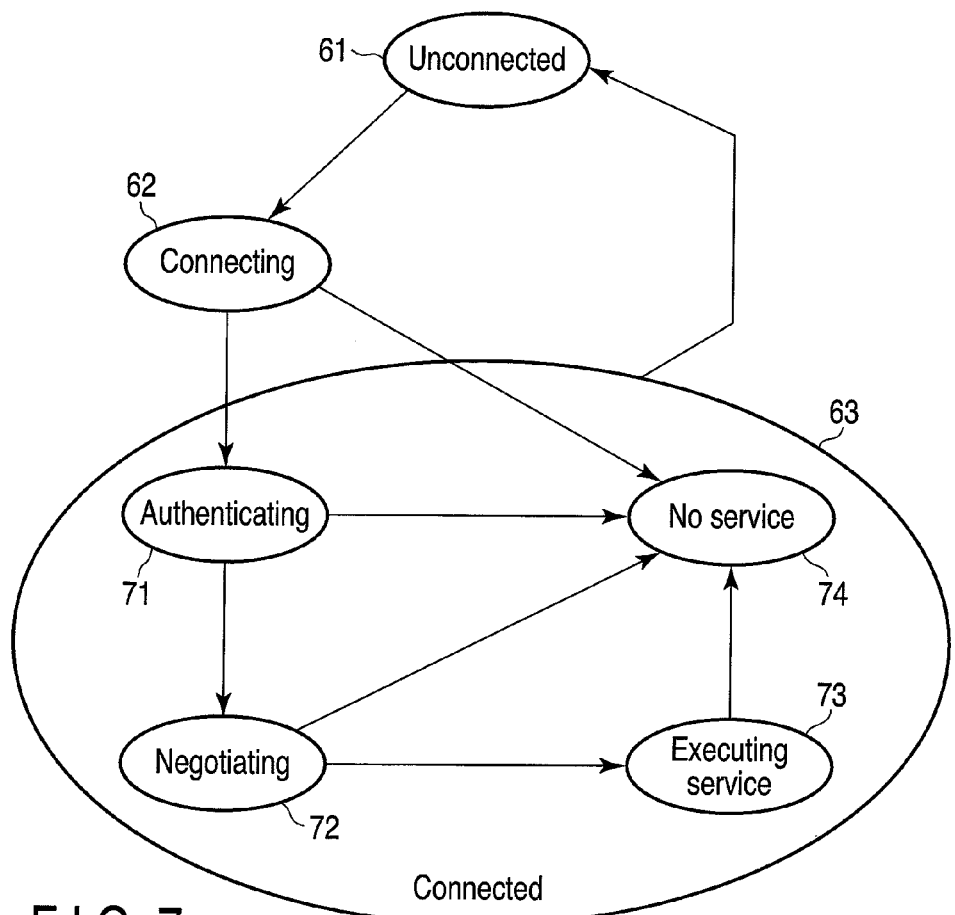

FIG. 7

ELECTRONIC APPARATUS AND COMMUNICATION CONTROL METHOD

CROSS-REFERENCE TO RELATED APPLICATIONS

This application is a continuation of U.S. patent application Ser. No. 12/942,409, filed Nov. 9, 2010, which is based upon and claims the benefit of priority from Japanese Patent Application No. 2009-260102, filed Nov. 13, 2009; the entire contents of each of which are incorporated herein by reference.

BACKGROUND

1. Field

Embodiments described herein relate generally to an electronic apparatus which executes close proximity wireless transfer, and a communication control method which is applied to this electronic apparatus.

2. Related Art

In recent years, in IC cards, mobile phones, etc., wireless communication such as near field communication (NFC) has begun to be used. A user can easily execute communication for an authentication process, an accounting process, etc., simply by performing an operation of holding the IC card or mobile phone over a reader/writer module of a host apparatus.

Recently, a novel close proximity wireless transfer technology, which enables communication at high speed, has begun to be developed. In this novel close proximity wireless transfer technology, not only authentication and accounting services can be performed between the devices, but also data files of text data, video data and audio data can be exchanged between the devices.

Jpn. Pat. Appln. KOKAI Publication No. 2009-140176 discloses a transaction apparatus which executes a transaction process, such as cash deposit/withdrawal, by close proximity non-contact communication with a mobile terminal, and issues a command to lock the operational function of the mobile terminal in response to the completion of the transaction process. This transaction apparatus can prevent the mobile terminal from being unlawfully used by a third party after the competition of the transaction process.

In the meantime, in order to make useful the close proximity wireless transfer between devices, it is required to automatically establish a connection between the devices, triggered by only a touch operation of bringing the devices close together, and to automatically start data transfer between the devices.

However, if one device is left in close proximity to the other device, these devices are reconnected, for example, each time the data transfer between the devices has been completed, and, as a result, it is possible, for example, that the same service, such as the transfer of the same data, is repeatedly executed over and over again.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 6 is an exemplary view for explaining an example of device modes which are used in the electronic apparatus of the embodiment;

FIG. 7 illustrates an example of a state transition of the communication control program which is used in the electronic apparatus of the embodiment;

DETAILED DESCRIPTION

Various embodiments will be described hereinafter with reference to the accompanying drawings.

In general, according to one embodiment, an electronic apparatus comprises a communication module, a connection control module, a communication control module, a connection release module and a halt module. The communication module is configured to execute close proximity wireless transfer. The connection control module is configured to transmit a connection request signal during a period in which the communication module is in an unconnected state, and to establish a connection between the communication module and an external device which are in a close proximity state. The communication control module is configured to execute a negotiation with the external device when the connection is established, to determine a service which is to be provided by close proximity wireless transfer between the communication module and the external device, and to execute the determined service. The connection release module is configured to release the connection between the communication module and the external device when there occurs an event of communication time-out due to a release of the close proximity state or an event of reception of a connection release request signal from the external device. The halt module is configured to halt the communication control module from executing the negotiation, when the connection is released by the connection release request signal and thereafter the connection between the communication module and the external device is re-established by the connection control module.

Figure 1:
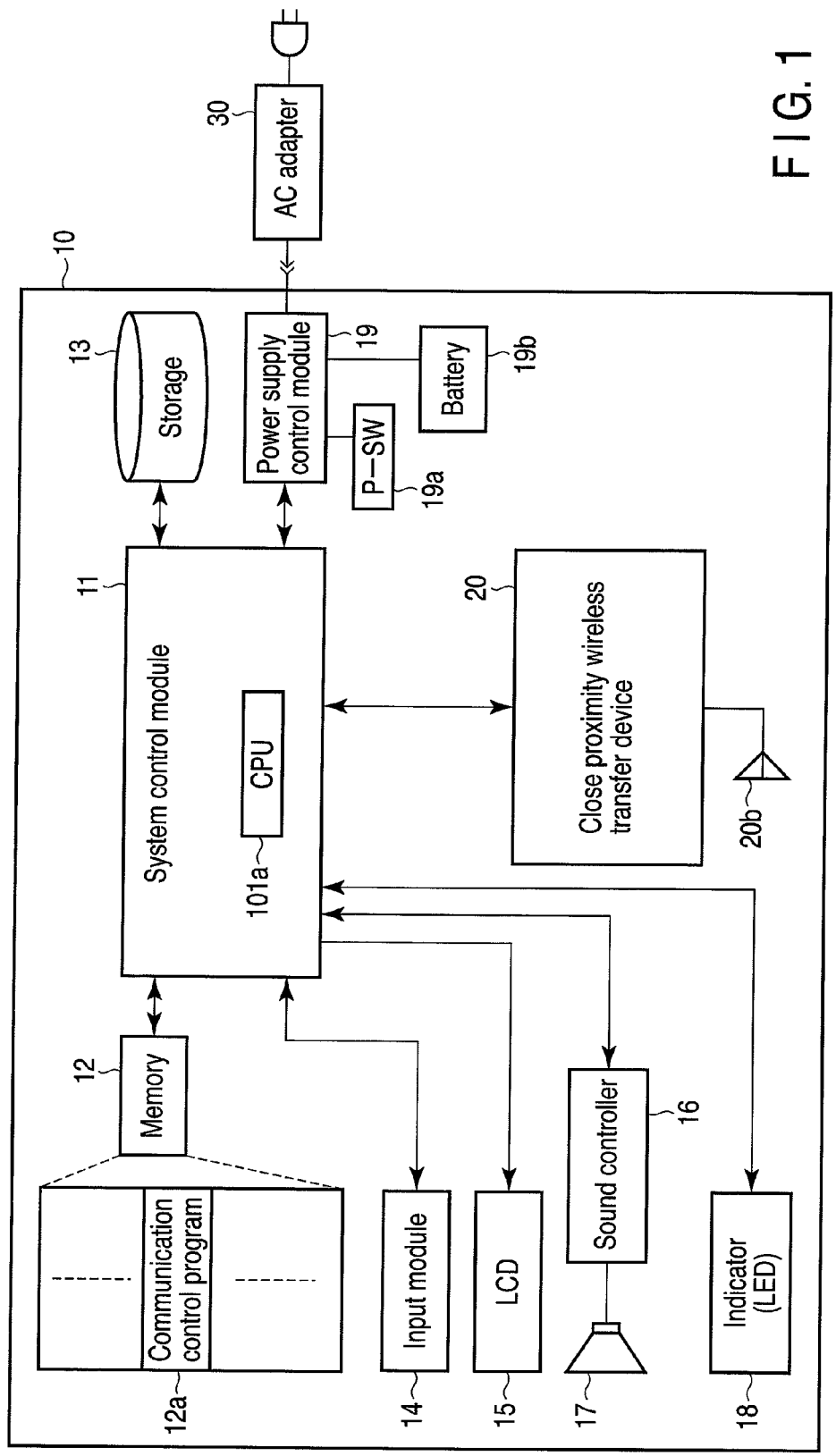
FIG. 1 is an exemplary block diagram illustrating the system configuration of an electronic apparatus according to an embodiment.

FIG. 1 illustrates the structure of an electronic apparatus according to an embodiment. The electronic apparatus 10 is realized, for example, as a portable computer, a mobile phone, a PDA, an audio player, or a TV. The electronic apparatus 10 includes a system control module 11, a memory 12, a storage device 13, an input module 14, a liquid crystal display (LCD) 15, a sound controller 16, a speaker 17, an indicator 18, a power supply control module 19, and a close proximity wireless transfer device 20.

The system control module 11 controls the operations of the respective components in the electronic apparatus 10. The system control module 11 is connected to the memory 12, storage device 13, input module 14, LCD 15, sound controller 16, indicator 18, power supply control module 19 and close proximity wireless transfer device 20. The system control module 11 includes a CPU 101a.

The CPU 101a is a processor which executes an operating system and various application programs/utility programs, which are loaded from the storage device 13 into the memory 12. The application programs/utility programs include a communication control program 12a for controlling the communication operation of the close proximity wireless transfer device 20.

The communication control program 12a has a communication control function for enhancing the connectability between an arbitrary electronic device (external device) having a close proximity wireless transfer function and the close proximity wireless transfer device 20, and preventing the same service from being repeatedly executed even when the close proximity wireless transfer device 20 and the external device are left in a close proximity state for a relatively long time.

The storage device 13 is composed of, e.g. a hard disk drive or a nonvolatile semiconductor memory. The input module 14 is an input device for inputting data and an instruction, which are to be delivered to the CPU 111. The input module 14 is realized, for example, by a keyboard, a plurality of button switches, or a pointing device.

The LCD 15 is a display device which is used as a display of the electronic apparatus 10. The sound controller 16 is a sound source circuit for producing sound corresponding to audio data which is sent from the CPU 101a. The sound controller 16 converts the audio data, which is sent from the CPU 101a, from a digital audio signal to an analog audio signal, and outputs the analog audio signal to the speaker 17. The speaker 17 produces sound corresponding to the analog audio signal.

The indicator 18 presents the state (e.g. the start of data transfer, the end of data transfer, etc.) of close proximity wireless transfer which is executed by the close proximity wireless transfer device 20. The indicator 18 includes a light emission module such as an LED.

The power supply control module 19 supplies power to the respective components in the electronic apparatus 10 by using power which is supplied from the outside via an AC adapter 30 or power which is supplied from a battery 19b provided in the electronic apparatus 10. In other words, the electronic apparatus 10 is driven by an external power supply such as an AC commercial power supply, or by the battery 19b. The AC adapter 30 may be provided within the electronic apparatus 10. The power supply control module 19 powers on and powers off the electronic apparatus 10 in accordance with an operation of a power switch (P-SW) 19a by the user.

The close proximity wireless transfer device 20 is a communication module which executes close proximity wireless transfer. The close proximity wireless transfer device 20 can communicate with some other device (external device) having a close proximity wireless transfer function, which is present within a predetermined range of communication from the close proximity wireless transfer device 20. The wireless communication between the close proximity wireless transfer device 20 and the external device is enabled only when the close proximity wireless transfer device 20 and the external device are in close proximity, that is, only when the distance between the close proximity wireless transfer device 20 and the external device is decreased to the range of communication (e.g. 3 cm) or less. When the close proximity wireless transfer device 20 and the external device are brought close together within the range of communication, the communication between the close proximity wireless transfer device 20 and the external device is enabled. Then, the operation of establishing a connection (wireless connection) between the close proximity wireless transfer device 20 and the external device is started. After the connection (wireless connection) between the devices is established, a service, such as data transfer using SCSI, OBEX or other general-purpose protocol, is executed by the close proximity wireless transfer between the close proximity wireless transfer device 20 and the external device.

In the close proximity wireless transfer, an induction electric field is used. As a close proximity wireless transfer method, TransferJet™, for instance, can be used. TransferJet™ is a close proximity wireless transfer method which uses UWB, and high-speed data transfer can be realized.

The close proximity wireless transfer device 20 is connected to an antenna 20b. The antenna 20b is an electrode called "coupler", and executes data transmission/reception to/from the external device by a wireless signal using an induction electric field. When the external device comes near within the range of communication (e.g. 3 cm) from the antenna 20b, the antennas (couplers) of the close proximity wireless transfer device 20 and the external device are coupled by the induction electric field, and thereby wireless communication between the close proximity wireless transfer device 20 and the external device is enabled. In the meantime, the close proximity wireless transfer device 20 and the antenna 20b can be realized as a single module.

Figure 2:
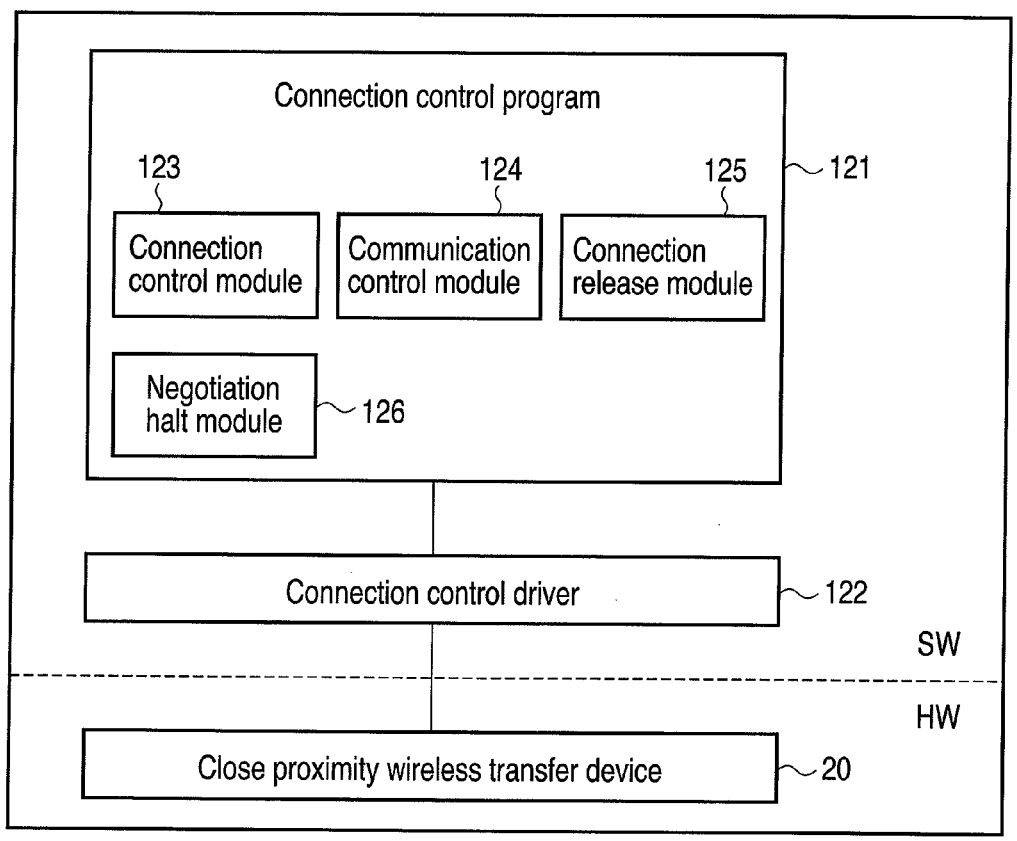
FIG. 2 is an exemplary block diagram illustrating the structure of a communication control program which is used in the electronic apparatus of the embodiment.

Next, referring to FIG. 2, the structure of the communication control program 12a is described.

The communication control program 12a includes a connection control program 121 and a connection control driver 122. The connection control driver 122 is a program for controlling the (physical) connection between the close proximity wireless transfer device 20 and the external device. The connection control program 121 manages the establishment and release of the connection between the close proximity wireless transfer device 20 and the external device, and also controls the execution of a service such as data transfer between the close proximity wireless transfer device 20 and the external device.

The connection control program 121 includes a connection control module 123, a communication control module 124, a connection release module 125 and a negotiation halt module 126. The connection control module 123 is a program module for establishing a connection, for example, between the close proximity wireless transfer device 20 and the external device. When the close proximity wireless transfer device 20 is in an unconnected state, the connection control module 123 detects an external device which is in close proximity to the close proximity wireless transfer device 20. To be more specific, while the close proximity wireless transfer device 20 is in the unconnected state, the connection control module 123 transmits a connection request signal via the close proximity wireless transfer device 20, and establishes a connection between the close proximity wireless transfer device 20 and the external device which are in a close proximity state. Responding to the establishment of the connection between the close proximity wireless transfer device 20 and the external device, the communication control module 124 executes a negotiation with the external device in order to determine a service which is to be provided by close proximity wireless transfer between the close proximity wireless transfer device 20 and the external device. Then, the communication control module 124 executes the determined service by close proximity wireless transfer. The connection release module 125 releases the connection between the close proximity wireless transfer device 20 and the external device when there occurs an event of communication time-out due to the release of the close proximity state between the devices, or an event of reception of a connection release request signal from the external device. The negotiation halt module 126 executes a process of halting the communication control module 124 from executing the negotiation, when the connection between the close proximity wireless transfer device 20 and the external device has been re-established after the connection between the close proximity wireless transfer device 20 and the external device was released by the reception of the connection release request signal from the external device.

Figure 3:
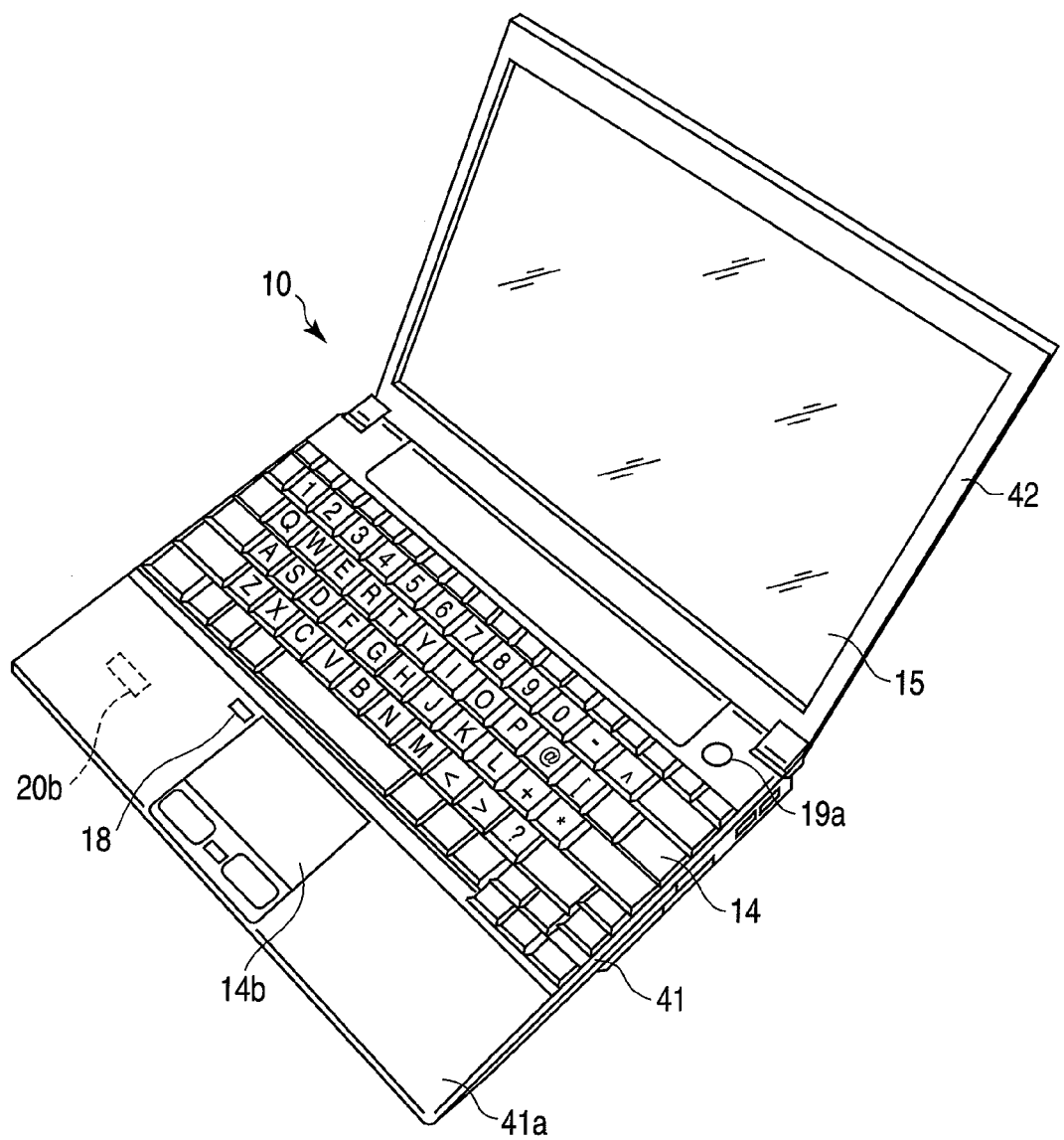
FIG. 3 is an exemplary perspective view illustrating the external appearance of the electronic apparatus of the embodiment.

Next, referring to FIG. 3, an example of the external appearance of the electronic apparatus 10 is described, assuming that the electronic apparatus 10 is realized as a portable personal computer.

FIG. 3 is a perspective view showing the external appearance of the electronic apparatus 10. The electronic apparatus 10 comprises a main body 41 and a display unit 42. The display unit 42 is attached to the main body 41 such that the display unit 42 is rotatable between an open position where the top surface of the main body 41 is exposed, and a closed position where the top surface of the main body 41 is covered by the display unit 42. The above-described LCD 15 is provided in the display unit 42.

The main body 41 has a thin box-shaped housing. A keyboard 14a, a touch pad 14b, indicator 18 and power switch 19a are disposed on the top surface of the housing of the main body 41.

The top surface of the main body 41, to be more specific, a part of a palm rest area 41a on the top surface of the main body 41, functions as a communication surface. Specifically, the close proximity wireless transfer device 20 and antenna (coupler) 20b are provided within the main body 41 so as to be opposed to the palm rest area 41a on the top surface of the main body 41. The antenna (coupler) 20b is disposed so as to output a wireless signal (induction electric field) to the outside via the top surface of the main body 41 (specifically, a part of the palm rest area 41a on the top surface of the main body 41). A small area on the top surface of the main body 41, which is opposed to the antenna (coupler) 20b, that is, a small area on the top surface of the main body 41, which is located on the upper side of the antenna (coupler) 20b, is used as a communication position.

The user can start a service, such as data transfer between the external device and the electronic apparatus 10, by performing, for example, an operation ("touch operation") of holding the external device, which has the close proximity wireless transfer function, over the communication position in the palm rest area 41a of the main body 41.

Figure 4:
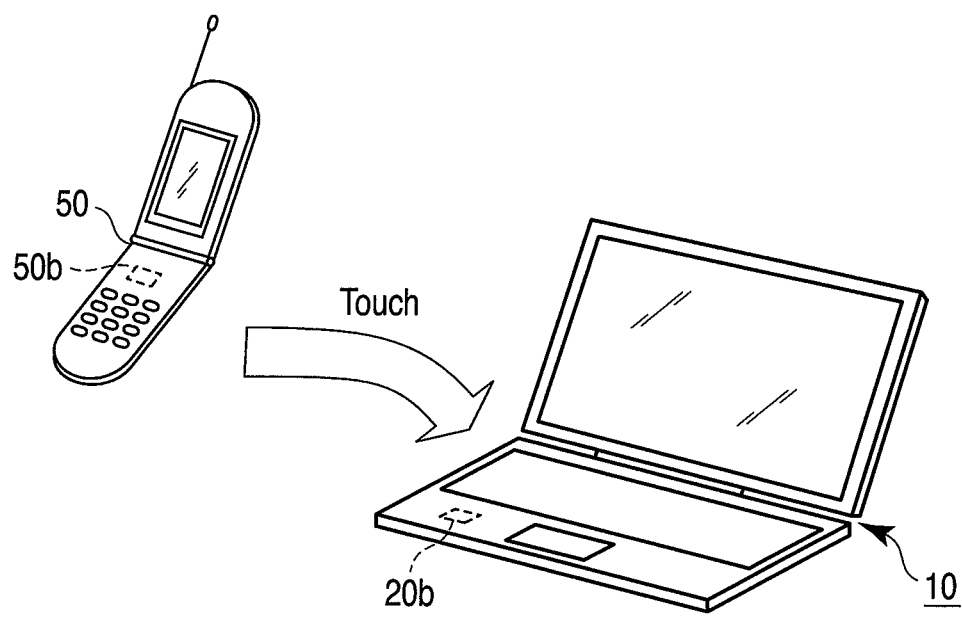
FIG. 4 illustrates an example of close proximity wireless transfer which is executed between the electronic apparatus of the embodiment and an external device.

FIG. 4 illustrates close proximity wireless transfer which is executed between a mobile phone 50 and the electronic apparatus 10. An antenna (coupler) for close proximity wireless transfer is provided within the housing of the mobile phone 50, for example, such that the antenna is opposed to the back surface of the housing. In this case, close proximity wireless transfer between the mobile phone 50 and electronic apparatus 10 can be started by bringing the back surface of the housing of the mobile phone 50 over the communication position on the palm rest area of the main body 41 of the electronic apparatus 20 (or by placing the mobile phone 50 on the palm rest area).

Figure 5:
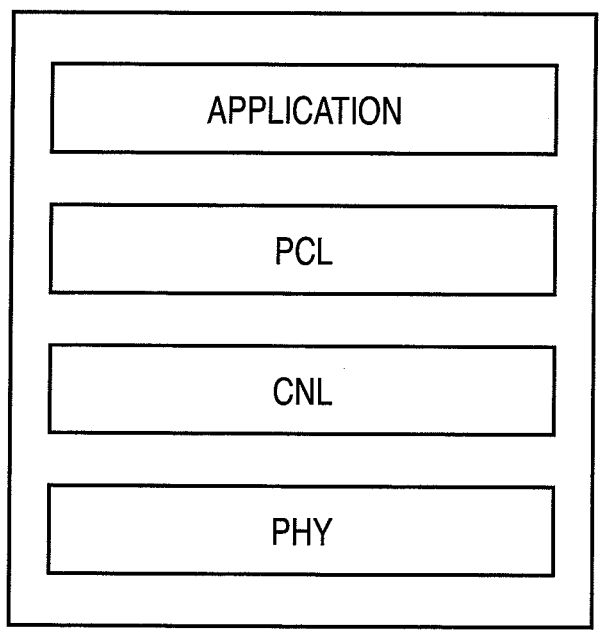
FIG. 5 illustrates an example of a software architecture for controlling close proximity wireless transfer, which is applied to the electronic apparatus of the embodiment.

Next, referring to FIG. 5, a description is given of a software architecture for controlling close proximity wireless transfer which is executed with use of the close proximity wireless transfer device 20.

The software architecture of FIG. 5 shows a hierarchical structure of a protocol stack for controlling close proximity wireless transfer. The protocol stack comprises a physical layer (PHY), a connection layer (CNL), a protocol conversion layer (PCL), and an application layer.

The physical layer (PHY) is a layer which controls physical data transfer, and corresponds to a physical layer in an OSI reference model. A part or all of the functions of the physical layer (PHY) may also be realized by using hardware in the close proximity wireless transfer device 20.

The physical layer (PHY) converts data from the connection layer (CNL) to a wireless signal. The connection layer (CNL) corresponds to a data link layer and a transport layer in the OSI reference model, and executes data communication by controlling the physical layer (PHY). The connection layer (CNL) may be realized by the above-described connection control driver 122.

Responding to a connection request which is received from the protocol conversion layer (PCL) or a connection request which is received from the external device, the connection layer (CNL) executes a process of establishing a (physical) connection (CNL connection) between the close proximity wireless transfer device 20 and the external device, which are set in a close proximity state. A description is now given of an example of the procedure for establishing a CNL connection between two devices (device 1 and device 2). Of the devices 1 and 2, the device which is to start communication, for example, the device 1, executes a process for wirelessly transmitting a connection request signal (C_Req). The connection request signal (C_Req) may include a unique ID (UID) of the device 1. The device 2 periodically executes a process for receiving the connection request signal (C_Req). When the device 1 and device 2 are in a close proximity state, the device 2 can receive the connection request signal (C_Req) which is transmitted from the device 1. When the device 2 has received the connection request signal (C_Req), the device 2 wirelessly transmits to the device 1 a response signal (C_Acc) which is indicative of the acceptance of the received connection request signal (C_Req). This response (C_Acc) may include a unique ID (UID) of the device 2. The device 1 can receive the response (C_Acc) which is wirelessly transmitted from the device 2. In this manner, the connection (CNL connection) between the device 1 and device 2 is established by transmitting/receiving the connection request signal (C_Req) and connection response signal (C_Acc) between the device 1 and device 2.

The protocol conversion layer (PCL) corresponds to a session layer and a presentation layer in the OSI reference model, and is positioned between the application layer and the connection layer (CNL). The protocol conversion layer (PCL) may be realized by the above-described connection control program 121. In order to establish the connection between the two devices, the protocol conversion layer (PCL)

executes control of each application (communication program) in the application layer, and executes control of the connection layer (CNL).

To be more specific, the protocol conversion layer (PCL) includes a plurality of communication adapters (PCL adapters) corresponding to a plurality of kinds of application protocols (e.g. SCSI, OBEX, other general-purpose protocol, etc.), and a PCL controller which controls the operation of the protocol conversion layer (PCL). The PCL controller activates one of the communication adapters (PCL adapters) in accordance with the application protocol (e.g. SCSI, OBEX, other general-purpose protocol, etc.) corresponding to the service which is to be executed. The activated PCL adapter converts the data (user data) of the application program, which corresponds to this PCL adapter, to a specific transmission data format which can be handled by the connection layer (CNL). By this conversion process, data, which is transmitted/received by any one of the communication programs, is converted to packets (data of a specific transmission data format) which can be handled by the connection layer (CNL). The protocol conversion layer (PCL) enables the use of various application protocols in the close proximity wireless transfer.

In the present embodiment, the PCL controller, which is realized by the connection control program 121, supports three device modes (proactive mode, reactive mode and flexible mode), as shown in FIG. 6, and is operable in one of these three device modes.

The proactive mode is a mode in which a connection request signal (connection request command) is actively transmitted, for example, for the purpose of data transfer between a local device and a communication-counterpart device. The communication-counterpart device is also referred to as "peer device". For example, when an application program for executing, e.g. data transfer by using close proximity wireless transfer is started, the device mode is automatically transitioned to the proactive mode. The proactive mode is a mode in which a device can function as a so-called master. A device in the proactive mode can execute a service such as data transfer between devices by controlling the communication-counterpart device.

The reactive mode is a mode in which a device waits for a connection request signal from the communication-counterpart device (the device in the proactive mode or the device in the flexible mode). The reactive mode is a mode for a device to function as a so-called slave. A device in the reactive mode can execute a service, such as data transfer between devices, under the control of the communication-counterpart device (the device in the proactive mode or the device in the flexible mode).

The default device mode of a mobile device, such as a mobile phone, which cannot be driven by an external power supply, is set to be the reactive mode in order to reduce power consumption. When a certain application program is activated on the mobile device by a user's operation, the mobile device can automatically transition from the reactive mode to the proactive mode.

The device, which is set in the proactive mode, sends a connection request signal C_Req. On the other hand, the device, which is set in the reactive mode, does not send a connection request signal C_Req, although receiving a connection request signal C_Req from the communication-counterpart device (the device in the proactive mode or the device in the flexible mode). Thus, the power consumption of the device in the reactive mode is relatively small.

The flexible mode is a mode in which a connection request signal C_Req is actively transmitted for the purpose of connection between a local device and a communication-counterpart device. This flexible mode is a mode in which the device mode of the local device can automatically be transitioned to the proactive mode or to the reactive mode in accordance with the device mode (proactive mode or reactive mode) of the communication-counterpart device.

The device in the flexible mode transitions to the reactive mode if the device mode of the communication-counterpart device is the proactive mode, and the device in the flexible mode transitions to the proactive mode if the device mode of the communication-counterpart device is the reactive mode. The transition to the proactive mode or to the reactive mode is executed, for example, after the CNL connection between the devices is established.

The default device mode of a device, such as a personal computer, which can be driven by an external power supply such as an AC adapter power supply, is the flexible mode. The device in the flexible mode can send a connection request signal C_Req. Thereby, for example, even in the case where the user brings the mobile phone close to the personal computer (the device in the flexible mode) without operating an application of the mobile phone, the connection between the devices can be established. Moreover, a service such as data transfer between the devices can be executed under the control of the personal computer which transitions to the proactive mode.

The combinations between connectable devices are only (1) a combination between a device in the proactive mode and a device in the reactive mode, (2) a combination between a device in the proactive mode and a device in the flexible mode, and (3) a combination between a device in the flexible mode and a device in the reactive mode. The default device mode of each device is either the reactive mode or flexible mode.

Next, referring to FIG. 7, a description is given of the transition of the status of the PCL controller which is realized by the connection control program 121 of the embodiment.

The PCL controller transitions to any one of three states, namely, an unconnected state 61, a connecting state 62 and a connected state 63. The unconnected state 61 is a state before devices are brought close together. In other words, the unconnected state 61 is a state in which no connection is established between the close proximity wireless transfer device 20 and any one of external devices. When the close proximity wireless transfer device 20 has received a connection request signal (C_Req) or a response signal (C_Acc) from the external device, the state of the PCL controller transitions to the connecting state 62.

The connecting state 62 is a state in which a CNL connection is being established. If the establishment of the CNL connection has been completed, the state of the PCL controller transitions to the connected state 63. In the connected state 63, the PCL controller starts a control sequence comprising three phases, namely, an authentication phase, a negotiation phase and a service execution phase. To start with, the PCL controller authenticates a communication-counterpart device in the authentication phase. If the authentication is successfully executed, the PCL controller transitions to the negotiation phase. In the negotiation phase, the PCL controller executes a negotiation with the communication-counterpart device, and determines a service which is to be provided. If the negotiation is successfully executed, the PCL controller transitions to the service execution phase. The PCL controller executes the service, which is determined by the negotiation, in the service execution phase.

To be more specific, in the connected state 63, for example, four sub-states (four phases), namely, an authenticating state 71, a negotiating state 72, an executing service state 73, and a no service state 74, are defined.

The authenticating state 71 corresponds to the above-described authentication phase. The authenticating state 71 is a state in which a process of authenticating a connection-counterpart device is being executed. If the authentication of the connection-counterpart device is successfully executed, the state of the PCL controller transitions to the negotiating state 72. On the other hand, if the authentication of the device has failed, the state of the PCL controller transitions to the no service state 74.

The negotiating state 72 corresponds to the above-described negotiation phase. The negotiating state 72 is a state in which a process is executed for determining a service (also referred to as "application service"), which is to be provided by close proximity wireless transfer between the close proximity wireless transfer device 20 and the external device, by the negotiation with the connection-counterpart device. During the period of the negotiating state 72, for example, information relating to the service to be executed (e.g. the kind of PCL adapter to be used, the kind of application protocol to be used, etc.) is exchanged between the devices under the control of the device which is in the proactive mode. Thereby, the service, which is to be executed by the close proximity wireless transfer between the devices, is determined. For example, the device in the proactive mode may report to the communication-counterpart device (the device in the reactive mode) the information relating to the service corresponding to the application program that is being executed on the device in the proactive mode, and the communication-counterpart device determines the reported service to be the service that is to be executed. In addition, the device, whose default device mode is the flexible mode, may determine, for example, a service that is pre-associated with the communication-counterpart device (the device in the reactive mode), to be a service that is to be executed, and may report to the communication-counterpart device the information relating to the determined service.

If the negotiation is successfully executed and the service to be used is determined, the PCL adapter and application program, which correspond to the determined service, are started, and the state of the PCL controller transitions to the executing service state 73. If the negotiation fails, the state of the PCL controller transitions to the no service state 74.

The executing service state 73 corresponds to the above-described service execution phase. The executing service state 73 is a state in which the determined service, such as data transfer, is being executed by close proximity wireless transfer. If the execution of the determined service is completed, the state of the PCL controller transitions to the no service state 74.

If the connection (CNL connection) between the devices is released ("disconnection"), the state of the PCL controller transitions to the unconnected state 61. Events that cause release of connection between the devices are classified into, for example, (1) the occurrence of communication time-out due to the release of the close proximity state, and (2) the reception of a connection release request signal C-RLS from the communication-counterpart device.

The communication time-out occurs when the communication between the devices is interrupted for a predetermined time-out value or more, after the devices are separated away from each other to a distance exceeding the range of communication. During the connected state 63, the CNL layer can periodically transmit, for example, a command (e.g. probe command) for confirming that the communication-counterpart device is present within the range of communication ("polling"). After this command is transmitted, if a response to this command is absent from the communication-counterpart device for a period longer than the time-out value, the CNL layer informs the PCL layer that communication time-out has occurred due to the release of the close proximity state. The PCL controller executes, for example, a process of halting the active PCL adapter, and a process of halting the active application, thereby releasing the connection between the devices and transitioning to the unconnected state 61.

The connection release request signal C-RLS is a command which explicitly requests the release of connection. The device in the connecting state 62 can transmit, where necessary, the connection release request signal C-RLS to the communication-counterpart device, for example, during the period in which the state of the device is the no service state 74.

Also when the connection release request signal C-RLS has been received from the communication-counterpart device, like the case in which communication-timeout has occurred, the PCL controller executes, for example, a process of halting the active PCL adapter, and a process of halting the active application, thereby releasing the connection between the devices and transitioning to the unconnected state 61.

The electronic apparatus 10 of the embodiment can operate in the flexible mode. In other words, the default device mode of the electronic apparatus 10 may be the flexible mode. Thus, during the period of the unconnected state 61, the PCL controller controls the CNL layer and transmits the connection request signal C-Req, so that a connection to a device in the reactive mode may also be established.

In the unconnected state 61, the PCL controller of the electronic apparatus 10 transmits a connection request signal. However, when the state of the PCL controller has transitioned to the unconnected state 61 due to the release of connection which results from communication time-out, the communication-counterpart device, which was previously connected to the electronic apparatus 10, is no longer present within the range of communication. Thus, even if the PCL controller transmits the connection request signal, a connection between this communication-counterpart device and the electronic apparatus 10 (close proximity wireless transfer device 20) is not re-established unless the user brings the communication-counterpart device and electronic apparatus 10 close together.

On the other hand, when the state of the PCL controller has transitioned to the unconnected state 61 due to the reception of the connection release request signal C-RLS from the communication-counterpart device, it is possible that this communication-counterpart device is kept in close proximity to the electronic apparatus 10 (close proximity wireless transfer device 20). Consequently, it is possible that the connection between the communication-counterpart device and electronic apparatus 10 is automatically re-established. In this case, it is possible that the same service, as was executed at the time of the previous connection, such as data transfer, is executed between the communication-counterpart device and electronic apparatus 10 (close proximity wireless transfer device 20). The communication-counterpart device may transmit the connection release request signal C-RLS each time the device state transitions to the no service state. In this case, such a problem occurs that the same service is repeatedly executed. For example, such a situation may occur that some identical data files are repeatedly transferred between the communication-counterpart device and the electronic apparatus 10 (close proximity wireless transfer device 20).

Figure 8:
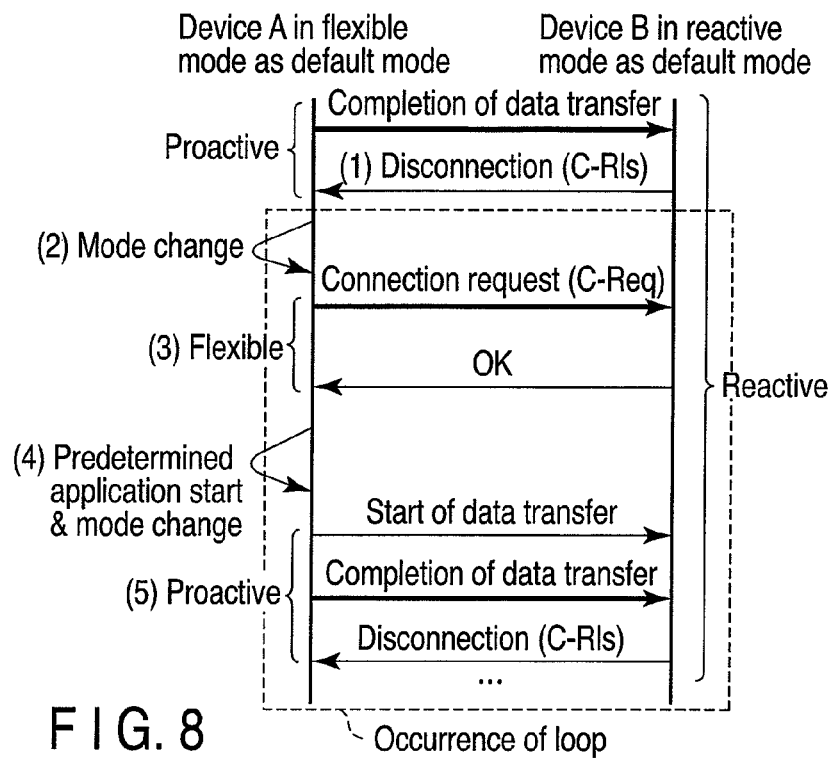
FIG. 8 is an exemplary view for describing an example in which the same service is repeatedly executed between two devices.

FIG. 8 illustrates an example of a sequence in which the same service is repeatedly executed. In FIG. 8, it is assumed that close proximity wireless transfer is executed between a device A whose default device mode is a flexible mode, and a device B whose default device mode is a reactive mode.

(1) After a connection between the device A and device B is established, the device mode of the device A transitions to the proactive mode. Under the control of the device A, data transfer is executed between the device A and device B. For example, when the data transfer has been completed, the device B may transmit a connection release request signal C-RLS (disconnection command).

(2) When the device A has received the connection release request signal C-RLS from the device B, the device A changes the device mode of the local device to the flexible mode that is the default device mode.

(3) The device A transmits a connection request signal C-Req in order to detect a peer device. When the device A has received from the device B a response signal C_Acc ("OK" in FIG. 8) indicative of acceptance of the connection request signal C_Req, the device A re-establishes the connection between the device A and device B.

(4) The device A determines a service by a negotiation with the device B, starts an application such as an application associated with the device B, and changes the own device mode to the proactive mode.

(5) The application, which has been started in (4), starts data transfer. When the data transfer is completed, the device B may re-transmit the connection release request signal C-RLS (disconnection command). As a result, the sequence (reconnection, data transfer), which is boxed with a broken line in FIG. 8, is repeated.

Figure 9:
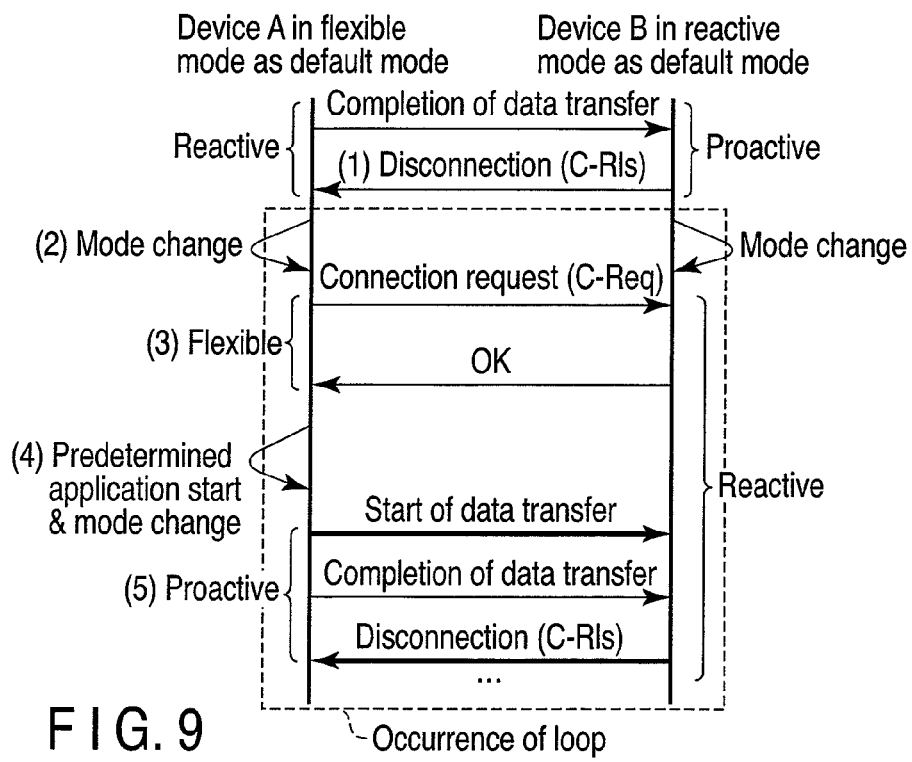
FIG. 9 is an exemplary view for describing another example in which the same service is repeatedly executed between two devices.

FIG. 9 illustrates an example of a sequence in which the same service is repeatedly executed. In FIG. 9, it is assumed that close proximity wireless transfer is executed between a device A in a flexible mode and a device B set in a proactive mode.

(1) After a connection between the device A and device B is established, the device mode of the device A transitions to the reactive mode. Under the control of the device B in the proactive mode, data transfer is executed between the device A and device B. For example, when the data transfer has been completed, the device B may transmit a connection release request signal C-RLS (disconnection command).

(2) When the device A has received the connection release request signal C-RLS from the device B, the device A changes the device mode of the local device to the flexible mode that is the default device mode. The device B also transitions to the reactive mode that is the default device mode.

(3) The device A transmits a connection request signal C-Req in order to detect a peer device. When the device A has received from the device B a response signal C-Acc ("OK" in FIG. 9) indicative of acceptance of the connection request signal C-Req, the device A establishes the connection between the device A and device B.

(4) The device A determines a service by a negotiation with the device B, starts an application such as an application associated with the device B, and changes the own device mode to the proactive mode.

(5) The application, which has been started in (4), starts data transfer. When the data transfer is completed, the device B may re-transmit the connection release request signal C-RLS (disconnection command). As a result, the sequence (reconnection, data transfer), which is boxed with a broken line in FIG. 9, is repeated.

The function of the flexible mode (e.g. the function of automatically transmitting the connection request signal in the unconnected state) is advantageous in that the connectivity between the devices is enhanced. However, as described above, if the devices are left in the close proximity state, it is possible that the problem of repetition of reconnection and data transfer will arise.

In order to prevent the occurrence of the repetition of reconnection and data transfer, the connection control program 121 of the embodiment compares an identifier of an external device (B2), which has newly established a connection to the close proximity wireless transfer device 20 after the CNL connection was released by the connection release request signal from an external device (B1), with an identifier of the external device (B1) which transmitted the connection release request signal. When these identifiers do not agree (the external device (B2) differs from the external device (B1)), the connection control program 121 executes data transfer between the external device (B2) and the close proximity wireless communication device 20. When these identifiers agree (the external device (B2) is identical to the external device (B1)), the connection control program 121 does not execute data transfer between the external device (B2) and the close proximity wireless communication device 20. For example, when these identifiers agree, the connection control program 121 halts the negotiation with the external device (B2), thereby to prevent re-execution of data transfer between the external device (B2) and the close proximity wireless communication device 20.

The process of halting the execution of the negotiation is executed on condition that the connection between the local device and the external device has been re-established after the connection between the local device and the external device was released due to the reception of the connection release request signal from the external device. When the connection between the devices has been established after communication time-out, the control sequence (also referred to as "connection process") for data transfer, that is, the authentication, negotiation and service execution, are carried out without condition.

In this manner, by halting the process in the negotiation phase, it becomes possible to prevent the repetition of reconnection and data transfer between the device in the flexible mode and the external device.

The LCD 15 may display, for example, a message for asking the user whether or not to continue the operation of the connection process with the same device. If the user has chosen not to continue the connection process, the connection control program 121 halts the execution of the connection process (e.g. the execution of the negotiation). On the other hand, if the user has chosen to continue the connection process, the connection control program 121 continues the connection process.

Figure 10:
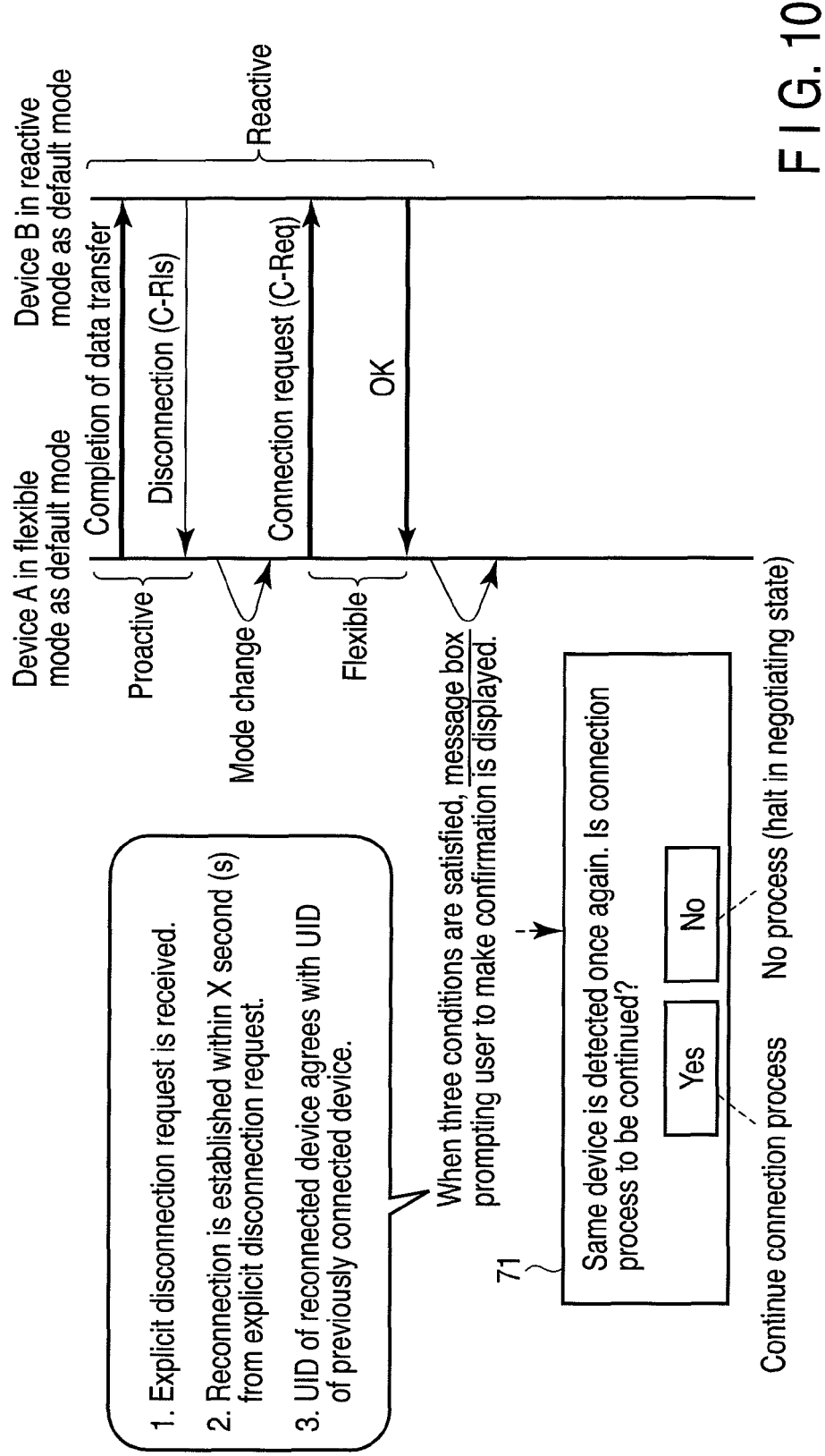
FIG. 10 is an exemplary view for describing an example of a communication control operation which is executed by the electronic apparatus of the embodiment.

Next, referring to FIG. 10, a description is given of an example of the communication control operation which is executed by the connection control program 121 of the embodiment. In FIG. 10, a device A is a device whose default device mode is a flexible mode, and a device B is a device whose default device mode is a reactive mode. The electronic apparatus 10 of the embodiment corresponds to the device A.

After a connection between the device A and device B is established, the device mode of the device A transitions to the proactive mode. Under the control of the device A, data transfer is executed between the device A and device B. For example, when the data transfer has been completed, the device B may transmit a connection release request signal C-RLS (disconnection command).

When the device A has received the connection release request signal C-RLS from the device B, the device A transitions to the unconnected state and changes the device mode of the device A to the flexible mode that is the default device mode. The device A transmits a connection request signal C-Req in order to detect a peer device. When the device A has received from the device B a response signal C_Acc ("OK" in FIG. 10) indicative of acceptance of the connection request signal C-Req, the device A re-establishes the connection between the device A and device B. The connection control program 121 of the device A transitions from the connecting state 62 to the connected state 63.

In this manner, when the connection between the device A and device B has been re-established after the release of connection by the connection release request signal C-RLS, the connection control program 121 causes the display screen of the LCD 15 to display a message box 71 for confirming with the user as to the continuation/discontinuation of the connection process with the same device, that is, a message for confirming with the user as to the continuation/discontinuation of the close proximity wireless transfer between the device A and device B. The message box 71 is displayed, for example, when the following three conditions have been established:

Condition 1: The cause of the immediately preceding connection release is the reception of the connection release request signal C-RLS from the external device.

Condition 2: A new connection has been established within a predetermined time (X second(s)) from the reception of the connection release request signal C-RLS.

Condition 3: The identifier (UID) of the external device, which has newly been connected to the local device, is identical to the identifier (UID) of the external device which was previously connected to the local device (i.e. the connection to the same external device has been re-established).

If the external device, which has transmitted the connection release request signal C-RLS, is left in close proximity to the local device, a new connection between the external device and the local device is automatically established within a predetermined time (X second(s)) from the reception of the connection release request signal C-RLS. Thus, Condition 2 can be used as a condition for confirming that the external device, which has transmitted the connection release request signal C-RLS, is left in close proximity to the local device. If the user once separates the external device, which transmitted the connection release request signal C-RLS, from the local device and then touches this external device to the local device, Condition 2 is, in many cases, not established.

The message box 71 may be displayed when two conditions, i.e. Condition 1 and Condition 2, are established. Whether the identifier (UID) of the external device, which has newly been connected to the local device, is identical to the identifier (UID) of the external device, which was previously connected to the local device, can be confirmed, for example, by an authentication process in the authenticating state 71. Specifically, when the connection control program 121 of the device A has transitioned to the authenticating state 71 in the connected state 63, the connection control program 121 compares the identifier (UID) of the external device, which has newly been connected to the local device, with the identifier (UID) of the external device which was previously connected to the local device (i.e. the external device which transmitted the connection release request signal C-RLS immediately before), thereby determining whether these UIDs agree or not.

If "Yes" button in the message box 71 is clicked by the user, the connection control program 121 determines a service, which is to be executed, in the negotiation phase, as usual, and executes the determined service in the service execution phase. On the other hand, if "No" button in the message box 71 is clicked by the user, the connection control program 121 halts the process in the negotiation phase. Thereby, the progress of the connection process is halted, for example, immediately before the start of the negotiation (at the beginning of the negotiation phase), or in the course of the negotiation. Thus, no service, such as data transfer, is executed between the device A and device B.

During the period in which the state of the device A is the connected state 63, the device A can monitor the presence/absence of the occurrence of communication time-out. Accordingly, even in the state in which the PCL controller of the device A halts the process in the negotiation phase, if the device B is separated away from the device A by the user, the occurrence of communication time-out is detected, and thus the state of the device A (the state of the connection control program 121) is transitioned to the unconnected state 61. Therefore, the device A can establish a new connection to a peer device.

Figure 11:
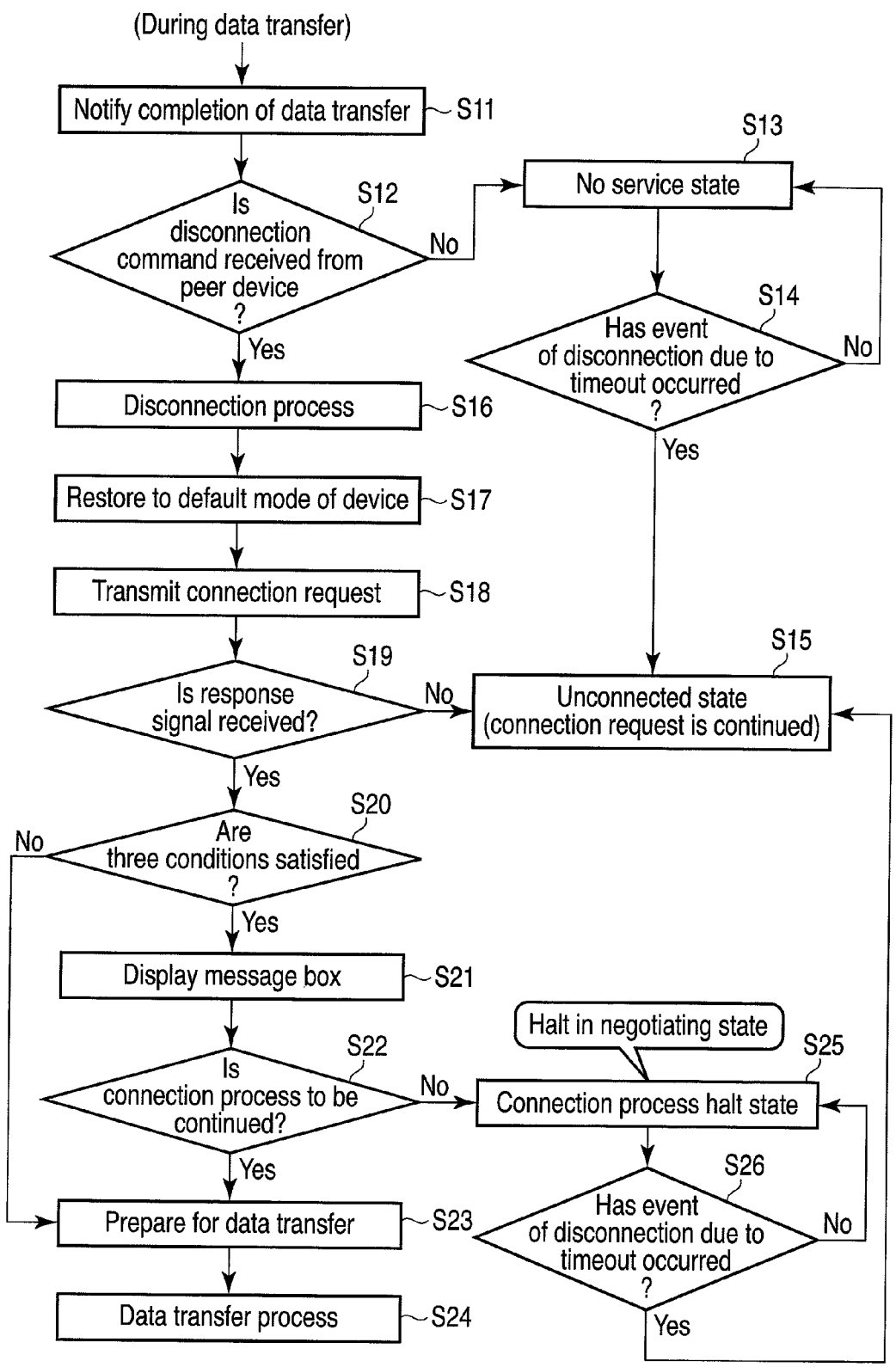
FIG. 11 is an exemplary flow chart illustrating an example of the procedure of a communication control process which is executed by the electronic apparatus of the embodiment.

Next, referring to a flow chart of FIG. 11, a description is given of an example of the procedure of a communication control process which is executed by the connection control program 121 in order to realize the sequence of FIG. 10.

After the communication control program 121 informs the peer device of the completion of the execution of a service such as data transfer or after the local device is informed of the completion of the execution of a service from the peer device (step S11), the communication control program 121 determines whether the connection release request signal C-RLS (disconnection command) has been received from the peer device (step S12).

If the connection release request signal C-RLS has not been received (NO in step S12), the state of the communication control program 121 transitions to the no service state 74 (step S13). If a disconnection event occurs due to communication time-out during the period in which the state of the communication control program 121 is the no service state 74 (YES in step S14), the communication control program 121 executes, where necessary, a process of halting the active PCL adapter, in order to release the connection between the local device (the close proximity wireless transfer device 20 of electronic apparatus 10) and the peer device, and sets the state of the PCL controller of the local device to be the unconnected state (disconnection state) 61 (step S15). In the unconnected state (disconnection state) 61, the communication control program 121, in cooperation with the CNL layer, starts the process of transmitting a connection request signal.

If the connection release request signal C-RLS has been received (YES in step S12), the communication control program 121 executes a connection release process (disconnection process) for releasing the connection between the local device and the peer device, and sets the state of the PCL controller of the local device to be the unconnected state (disconnection state) 61 (step S16). In step S16, for example, a process of halting the active PCL adapter is executed.

The communication control program 121 restores the device mode of the local device to the flexible mode that is the default mode (step S17). Then, the communication control program 121 starts the process of transmitting the connection request signal (step S18).

In the unconnected state (disconnection state) 61, if the communication control program 121 receives the response signal C_Acc from the peer device (or the connection request signal C_Req from the peer device) (YES in step S19), the communication control program 121, in cooperation with the CNL layer, establishes a connection between the peer device, which has transmitted the response signal C_Acc or connection request signal C_Req, and the local device, and transitions to the authenticating state 71 in the connected state 63. The communication control program 121 authenticates the peer device and determines whether the above-described three conditions are satisfied (step S20).

If the three conditions are satisfied (YES in step S20), the communication control program 121 displays the message box 71 on the LCD 15 and confirms with the user as to whether the connection process with the same device is to be continued or not (step S21).

If the user chooses to continue the connection process (YES in step S22), the communication control program 121 prepares for data transfer (step S23). In step S23, the communication control program 121 enters the negotiation phase (negotiating state 72). Then, the communication control program 121 executes the negotiation with the peer device in the negotiation phase, in order to determine the service which is to be provided by the close proximity wireless transfer between the local device and the peer device. The communication control program 121 transitions to the service execution phase (executing service state 73) and executes the determined service (data transfer) in the service execution phase (step S24).

If the user chooses not to continue the connection process (NO in step S22), the communication control program 121 halts the process in the negotiation phase (step S25). As a result, since the negotiation with the peer device is not executed, the service, which is to be provided by the close proximity wireless transfer between the local device and the peer device, is not determined. Thus, neither the local device nor the peer device can select or start the PCL adapter and application program. Hence, no service (data transfer) is started. If a disconnection event occurs due to communication time-out during the period in which the connection process is halted (YES in step S26), the communication control program 121 sets the state of the PCL controller of the local device to be the unconnected state (disconnection state) 61 (step S15).

Figure 12:
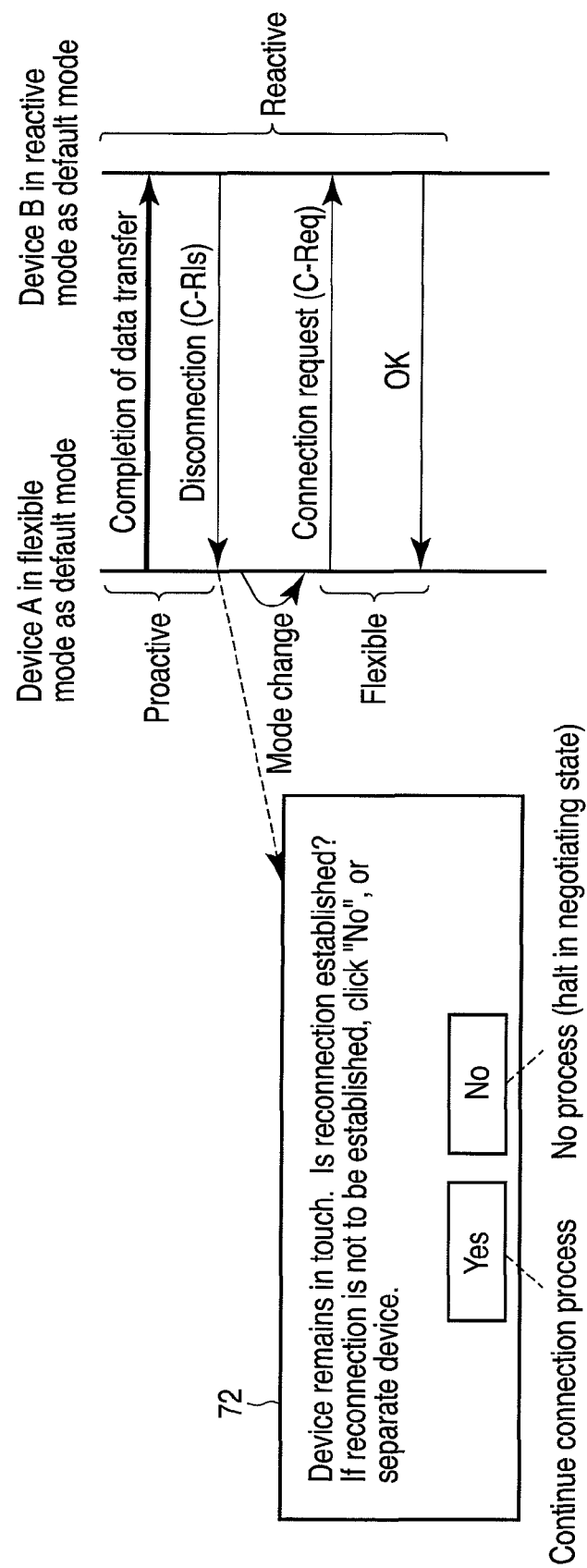
FIG. 12 is an exemplary view for describing another example of the communication control operation which is executed by the electronic apparatus of the embodiment.

Next, referring to FIG. 12, a description is given of another example of the communication control operation which is executed by the connection control program 121 of the embodiment. In FIG. 12, a device A is a device whose default device mode is a flexible mode, and a device B is a device whose default device mode is a reactive mode. The electronic apparatus 10 of the embodiment corresponds to the device A.

After a connection between the device A and device B is established, the device mode of the device A transitions to the proactive mode. Under the control of the device A, data transfer is executed between the device A and device B. For example, when the data transfer has been completed, the device B may transmit a connection release request signal C-RLS (disconnection command).

When the device A has received the connection release request signal C-RLS from the device B, the communication control program 121 displays a message box 72 on the LCD 15 at this time point. The message box 72 is used in order to inform the user that the device remains touched to the electronic apparatus 10 and to confirm with the user about the presence/absence of reconnection to the device (the continuation of the connection process). Further, the message box 72 displays a message recommending the user to separate the device away from the electronic apparatus 10 when the user does not desire the reconnection.

Under the control of the connection control program 121, the device A continues the process. Specifically, the device A transitions to the unconnected state and changes the device mode of the device A to the flexible mode that is the default device mode. The device A transmits a connection request signal C_Req in order to detect a peer device. When the device A has received from the device B a response signal C_Acc ("OK" in FIG. 12) indicative of acceptance of the connection request signal C_Req, the device A re-establishes the connection between the device A and device B.

If "Yes" button in the message box 72 is clicked by the user, the connection control program 121 determines a service, which is to be executed, in the negotiation phase, as usual, and executes the determined service in the service execution phase. On the other hand, if "No" button in the message box 72 is clicked by the user, the connection control program 121 halts the process in the negotiation phase. Thereby, the progress of the connection process is halted, for example, immediately before the start of the negotiation, or in the course of the negotiation. Thus, no service, such as data transfer, is executed between the device A and device B.

If the device B is separated away from the device A by the user, the occurrence of communication time-out is detected, and thus the state of the device A (the state of the connection control program 121) is transitioned to the unconnected state 61.

Figure 13:
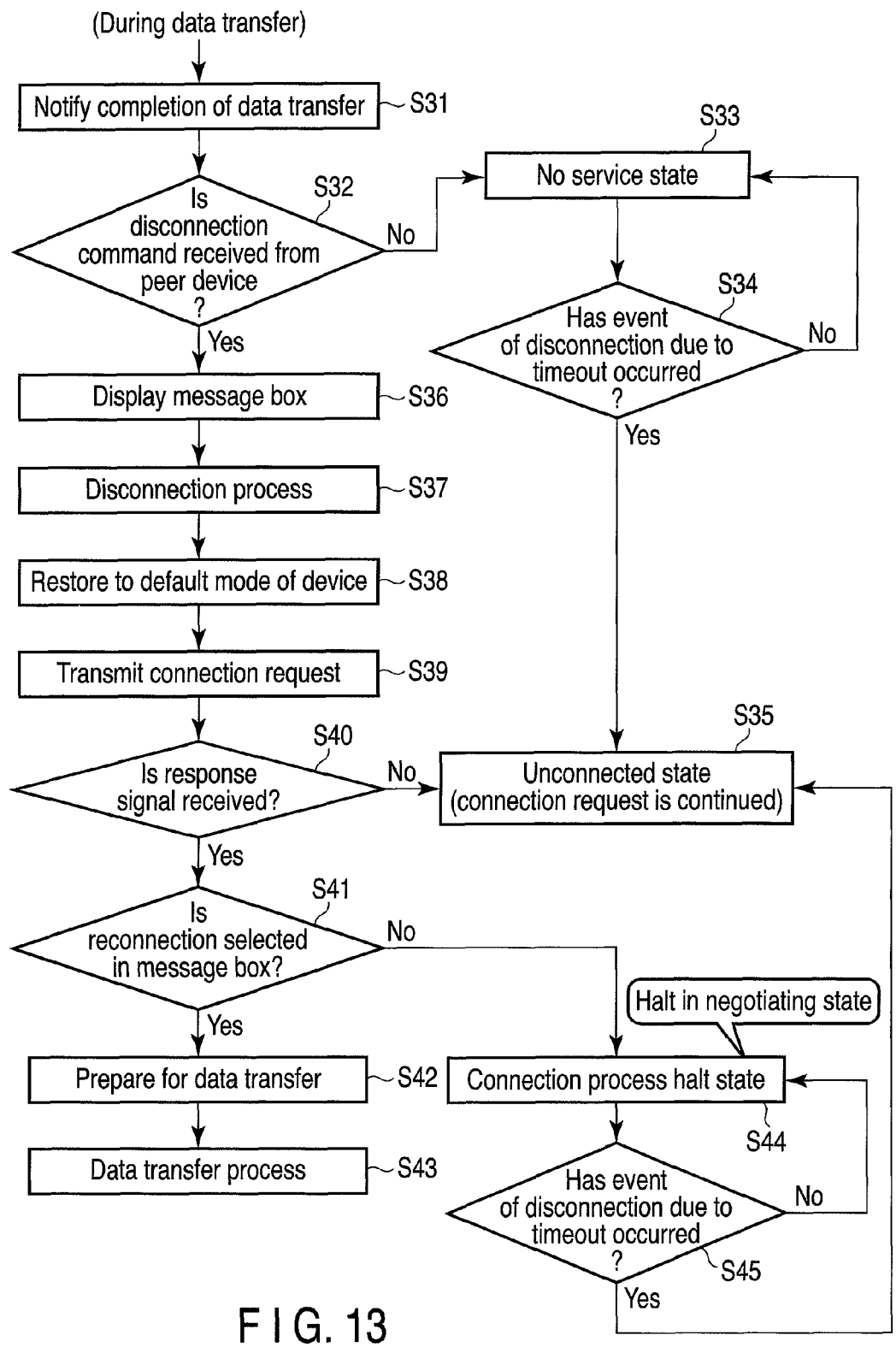
FIG. 13 is an exemplary flow chart illustrating another example of the procedure of the communication control process which is executed by the electronic apparatus of the embodiment.

Next, referring to a flow chart of FIG. 13, a description is given of an example of the procedure of a communication control process which is executed by the connection control program 121 in order to realize the sequence of FIG. 12.

After the communication control program 121 informs the peer device of the completion of the execution of a service such as data transfer or after the local device is informed of the completion of the execution of a service from the peer device (step S31), the communication control program 121 determines whether the connection release request signal C-RLS (disconnection command) has been received from the peer device (step S32).

If the connection release request signal C-RLS has not been received (NO in step S32), the state of the communication control program 121 transitions to the no service state 74 (step S33). If a disconnection event occurs due to communication time-out during the period in which the state of the communication control program 121 is the no service state 74 (YES in step S34), the communication control program 121 executes, where necessary, a process of halting the active PCL adapter, in order to release the connection between the local device (the close proximity wireless transfer device 20 of electronic apparatus 10) and the peer device, and sets the state of the PCL controller of the local device to be the unconnected state (disconnection state) 61 (step S35). In the unconnected state (disconnection state) 61, the communication control program 121, in cooperation with the CNL layer, starts the process of transmitting a connection request signal.

If the connection release request signal C-RLS has been received (YES in step S32), the communication control program 121 first displays the message box 72 on the LCD 15, thereby informing the user that the device remains touched to the electronic apparatus 10, and confirming with the user about the intention of reconnection to the device (step S36).

In the state in which the message box 72 is displayed, the communication control program 121 executes a connection release process (disconnection process) for releasing the connection between the local device (electronic apparatus 10) and the peer device, and sets the state of the PCL controller of the local device to be the unconnected state (disconnection state) 61 (step S37). The communication control program 121 restores the device mode of the local device to the flexible mode that is the default mode (step S38). Then, the communication control program 121 starts the process of transmitting the connection request signal (step S39).

In the unconnected state (disconnection state) 61, if the communication control program 121 receives the response signal C_Acc from the peer device (or the connection request signal C_Req from the peer device) (YES in step S40), the communication control program 121, in cooperation with the CNL layer, establishes a connection between the peer device, which has transmitted the response signal C_Acc or connection request signal C_Req, and the local device, and transitions to the authenticating state 71 in the connected state 63.

The communication control program 121 determines whether "Yes" button or "No" button in the message box 72 is selected by the user (step S41). If "Yes" button is selected, that is, if the continuation of the connection process is selected by the user (YES in step S41), the communication control program 121 prepares for data transfer (step S42). In step S42, the communication control program 121 enters the negotiation phase (negotiating state 72). Then, the communication control program 121 executes the negotiation with the peer device in the negotiation phase, in order to determine the service which is to be provided by the close proximity wireless transfer between the local device and the peer device. The communication control program 121 transitions to the service execution phase (executing service state 73) and executes the determined service (data transfer) in the service execution phase (step S43).

If "No" button is selected, that is, if the discontinuation of the connection process is selected by the user, or if neither "Yes" button nor "No" button is selected by the user (NO in step S41), the communication control program 121 halts the process in the negotiation phase (step S44). As a result, the service, which is to be provided by the close proximity wireless transfer between the local device and the peer device, is not determined. Thus, since neither the local device nor the peer device can select or start the PCL adapter and application program, no service is started. If a disconnection event occurs due to communication time-out during the period in which the connection process is halted (YES in step S45), the communication control program 121 sets the state of the PCL controller of the local device to be the unconnected state (disconnection state) 61 (step S35).

As has been described above, according to the present embodiment, even if the connection between the external device and the electronic apparatus 10 is re-established due to the reception of the connection release request from the external device, it is possible to prevent re-execution of the same service as was executed when the connection was previously established.

The functions of the connection control program of the embodiment can be realized by hardware modules.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a communication module configured to execute close proximity wireless transfer;
   a connection control module configured to transmit a connection request signal during a period in which the communication module is in an unconnected state, and to establish a connection between the communication module and an external device which are in a close proximity state;
   a communication control module configured to execute a negotiation with the external device when the connection is established, to determine a service which is to be provided by close proximity wireless transfer between the communication module and the external device, and to execute the determined service;
   a connection release module configured to release the connection between the communication module and the external device when there occurs an event of communication time-out due to a release of the close proximity state or an event of reception of a connection release request signal from the external device; and
   a halt module configured to halt the communication control module from executing the negotiation, if (i) the connection between the communication module and the external device is released by the connection release request signal supplied from the external device and (ii) before an elapse of a predetermined time from time at which the connection is released by the connection release request signal, a new connection between the communication module and the external device is re-established by the connection control module.

2. The electronic apparatus of claim 1, wherein the halt module is configured to display on a display a message for confirming with a user about whether or not to continue the close proximity wireless transfer between the communication module and the external device, and to halt the communication control module from executing the negotiation when the user designates not to continue the close proximity wireless transfer.

3. The electronic apparatus of claim 1, wherein the halt module is configured to determine whether an identifier of an external device, a connection of which is newly established to the communication module by the connection control module after the release of the connection by the connection release request signal, agrees with an identifier of the external device which is previously connected to the communication module, and to halt the communication control module from executing the negotiation when the identifiers agree.

4. The electronic apparatus of claim 1, wherein the halt module is configured to display on a display a message for confirming with a user about whether or not to continue the close proximity wireless transfer between the communication module and the external device, to halt the communication control module from executing the negotiation when the user designates not to continue the close proximity wireless transfer, and to permit the communication control module to execute the negotiation when the user designates to continue the close proximity wireless transfer.

5. An electronic apparatus comprising:
   a communication module configured to execute close proximity wireless transfer;
   a connection control module configured to transmit a connection request signal during a period in which the communication module is in an unconnected state, and to establish a connection between the communication module and a first external device which are in a close proximity state;

a communication control module configured to execute data transfer between the communication module and the first external device; and a connection release module configured to release the connection between the communication module and the first external device when there occurs an event of communication time-out due to a release of the close proximity state or an event of reception of a connection release request signal from the first external device, wherein the communication control module is further configured:

if (i) the connection between the communication module and the first external device is released by the connection release request signal supplied from the first external device and (ii) before an elapse of a predetermined time from time at which the connection is released by the connection release request signal, a new connection between the communication module and a second external device is established by the connection control module:

to compare an identifier of the second external device with an identifier of the first external device;

to execute data transfer between the communication module and the second external device if the identifiers disagree; and not to execute the data transfer between the communication module and the second external device if the identifiers agree.

6. A communication control method of controlling close proximity wireless transfer which is executed by a communication module provided in an electronic apparatus, comprising:

transmitting a connection request signal during a period in which the communication module is in an unconnected state, and establishing a connection between the communication module and an external device which are in a close proximity state;

executing a negotiation with the external device when the connection is established, determining a service which is to be provided by close proximity wireless transfer between the communication module and the external device, and executing the determined service;

releasing the connection between the communication module and the external device when there occurs an event of communication time-out due to a release of the close proximity state or an event of reception of a connection release request signal from the external device; and halting the execution of the negotiation, if (i) the connection between the communication module and the external device is released by the connection release request signal supplied from the external device and (ii) before an elapse of a predetermined time from time at which the connection is released by the connection release request signal, a new connection between the communication module and the external device is re-established.

7. The communication control method of claim 6, wherein the halting comprises displaying on a display a message for confirming with a user about whether or not to continue the close proximity wireless transfer between the communication module and the external device, and halting the execution of the negotiation when the user designates not to continue the close proximity wireless transfer.

8. The communication control method of claim 6, wherein the halting comprises determining whether an identifier of an external device, a connection of which is newly established to the communication module after the release of the connection by the connection release request signal, agrees with an identifier of the external device which is previously connected to the communication module, and halting the execution of the negotiation when the identifiers agree.

9. The communication control method of claim 6, wherein the halting comprises displaying on a display a message for confirming with a user about whether or not to continue the close proximity wireless transfer between the communication module and the external device, halting the execution of the negotiation when the user designates not to continue the close proximity wireless transfer, and permitting the execution of the negotiation when the user designates to continue the close proximity wireless transfer.

10. An electronic apparatus comprising:

a communication module configured to execute close proximity wireless transfer;

a connection control module configured to transmit a connection request signal during a period in which the communication module is in an unconnected state, and to establish a connection between the communication module and an external device which are in a close proximity state;

a communication control module configured to execute data transfer between the communication module and the external device when the connection is established; and a connection release module configured to release the connection between the communication module and the external device when there occurs an event of communication time-out due to a release of the close proximity state or an event of reception of a connection release request signal from the external device, wherein the communication control module does not to execute data transfer between the communication module and the external device, if (i) the connection between the communication module and the external device is released by the connection release request signal and (ii) before an elapse of a predetermined time from time at which the connection is released by the connection release request signal, a new connection between the communication module and the external device is re-established.

11. The electronic apparatus of claim 10, wherein the communication control module is further configured:

if (i) the connection between the communication module and the external device is released by the connection release request signal and (ii) before the elapse of the predetermined time from time at which the connection is released by the connection release request signal, the new connection between the communication module and the external device is re-established by the connection control module:

to display on a display a message for confirming with a user about whether or not to continue the close proximity wireless transfer between the communication module and the external device; and not to execute data transfer between the communication module and the external device if the user designates not to continue the close proximity wireless transfer.

12. The electronic apparatus of claim 10, wherein the communication control module is further configured:

if (i) the connection between the communication module and the external device is released by the connection release request signal and (ii) before the elapse of the predetermined time from time at which the connection is released by the connection release request signal, the new connection between the communication module and the external device is re-established by the connection control module:
- to display on a display a message for confirming with a user about whether or not to continue the close proximity wireless transfer between the communication module and the external device;
- not to execute data transfer between the communication module and the external device if the user designates not to continue the close proximity wireless transfer; and
- to execute data transfer between the communication module and the external device if the user designates to continue the close proximity wireless transfer.

13. A communication control method of controlling close proximity wireless transfer which is executed by a communication module provided in an electronic apparatus, comprising:
- transmitting a connection request signal during a period in which the communication module is in an unconnected state, and establishing a connection between the communication module and an external device which are in a close proximity state;
- executing data transfer between the communication module and the external device; and
- releasing the connection between the communication module and the external device when there occurs an event of communication time-out due to a release of the close proximity state or an event of reception of a connection release request signal from the external device,
- wherein if (i) the connection between the communication module and the external device is released by the connection release request signal and (ii) before an elapse of a predetermined time from time at which the connection is released by the connection release request signal, a new connection between the communication module and the external device is re-established by the connection control module, the executing does not execute data transfer between the communication module and the external device.

14. The communication control method of claim 13, further comprising displaying on a display a message for confirming with a user about whether or not to continue the close proximity wireless transfer between the communication module and the external device, if (i) the connection between the communication module and the external device is released by the connection release request signal and (ii) before the elapses of the predetermined time from time at which the connection is released by the connection release request signal, the new connection between the communication module and the external device is re-established, and wherein the executing does not execute data transfer between the communication module and the external device if the user designates not to continue the close proximity wireless transfer.

15. The communication control method of claim 13, further comprising displaying on a display a message for confirming with a user about whether or not to continue the close proximity wireless transfer between the communication module and the external device, if (i) the connection between the communication module and the external device is released by the connection release request signal and (ii) before the elapses of the predetermined time from time at which the connection is released by the connection release request signal, the new connection between the communication module and the external device is re-established by the connection control module, and wherein the executing does not execute data transfer between the communication module and the external device if the user designates not to continue the close proximity wireless transfer, and wherein the executing executes data transfer between the communication module and the external device if the user designates to continue the close proximity wireless transfer.

* * * * *